United States Patent
Kropp et al.

(10) Patent No.: US 6,925,700 B2
(45) Date of Patent: Aug. 9, 2005

(54) METHOD FOR PRODUCING LARGE-AREA PLANAR WAVE GUIDE STRUCTURES

(75) Inventors: Jörg-Reinhart Kropp, Berlin (DE); Detlef Krabe, Berlin (DE)

(73) Assignee: Infineon Technologies AG, Munich (DE)

(*) Notice: Subject to any disclaimer, the term of this patent is extended or adjusted under 35 U.S.C. 154(b) by 291 days.

(21) Appl. No.: 10/012,852

(22) Filed: Oct. 30, 2001

(65) Prior Publication Data

US 2002/0059716 A1 May 23, 2002

(30) Foreign Application Priority Data

Oct. 30, 2000 (DE) .......................................... 100 54 373

(51) Int. Cl.[7] .......................... H01P 11/00; H01Q 13/00
(52) U.S. Cl. .......................... 29/600; 29/592.1; 29/833; 83/29; 83/35; 83/36; 333/239; 333/248
(58) Field of Search ................................ 29/592.1, 600, 29/833; 333/239, 248; 83/29, 35, 36

(56) References Cited

U.S. PATENT DOCUMENTS

| | | | | |
|---|---|---|---|---|
| 5,184,111 A | * | 2/1993 | Pichl ........................ 340/572.1 |
| 5,455,382 A | * | 10/1995 | Kojima et al. .............. 174/16.3 |
| 5,928,465 A | * | 7/1999 | Schmidt ...................... 156/511 |
| 6,066,231 A | * | 5/2000 | Maestri et al. ........... 156/379.8 |
| 6,272,275 B1 | * | 8/2001 | Cortright et al. ........... 385/129 |

FOREIGN PATENT DOCUMENTS

| | | | | |
|---|---|---|---|---|
| DE | 3437414 A | * | 4/1986 | ........... B29C/59/04 |
| WO | WO 01/01175 A1 | | 1/2001 | |

OTHER PUBLICATIONS

"Analysis of general multi-channel planar waveguides"; Jungwirth, M.; Pocksteiner, N.; Kovacs, G.; Weigel, R.; Ultrasonics, Ferroelectrics and Frequency Control, IEEE Transactions on, vol.: 49, Issue: 4, Apr 2002; pp.: 519–527.*

* cited by examiner

Primary Examiner—Paul D Kim
(74) Attorney, Agent, or Firm—Laurence A. Greenberg; Werner H. Stemer; Ralph E. Locher

(57) ABSTRACT

A method and a device for producing large-area planar wave guide structures is described. A planar substrate is provided with channel-shaped structures and the channel-shaped structures are filled with a wave guide material. The channel-shaped structures are introduced sequentially into the substrate by a stamping tool, the substrate and the stamping tool are moved relative to one another. Therefore, it is easy and inexpensive to apply precise wave guide structures to surfaces of any desired size.

14 Claims, 5 Drawing Sheets

METHOD FOR PRODUCING LARGE-AREA PLANAR WAVE GUIDE STRUCTURES

BACKGROUND OF THE INVENTION

Field of the Invention

The invention relates to a method for producing large-area planar wave guide structures. The planar wave guide structures are produced from a planar substrate having channel-shaped structures formed therein and the channel-shaped structures are then filled with a wave guide material. The invention also relates to a device for carrying out the method.

By way of example, when producing optical parallel connections over long distances or when routing wave guides, there is a problem with producing wave guide structures on expansive substrates.

In this connection, it is known to produce sheets with embedded glass fibers. In this case, a laying device is used to lay individual glass fibers onto the surface of a first sheet, and the fibers are fastened or stuck to the sheet in sections. Then, a second sheet is adhesively bonded or laminated onto the first sheet. A drawback of the method is an inhomogeneous combination of materials with optical wave guides that are disposed in a plastic surrounding.

Another known method for producing large-area planar wave guide structures provides a planar process in which, a photosensitive plastic layer is applied to a substrate. Then, selective exposure takes place by using a mask or partial, sequential illumination. The unexposed area is then removed chemically, so that wave guide trenches are formed. After curing of the structure, a further layer is applied in the wave guide trenches, forming the optical core region of the wave guides. Because of the large number of steps, the method described is relatively complex and expensive.

Furthermore, it is known to form specific wave guide contours on the surface of stamping rams and to transfer the wave guide contours into a polymer by hot-stamping. The channels that are formed are then filled with the wave guide material, and a covering sheet is applied as an optical sheath. Since the stamping rams, on account of the tight tolerances required for the wave guide contours, can generally only be of a limited size, the technique is restricted to relatively small areas.

SUMMARY OF THE INVENTION

It is accordingly an object of the invention to provide a method and a device for producing large-area planar wave guide structures which overcome the above-mentioned disadvantages of the prior art methods and devices of this general type, which are distinguished by accurate wave guide structures, that can be used on surfaces of any desired area and, in addition, are easy to implement.

With the foregoing and other objects in view there is provided, in accordance with the invention, a method for producing large-area planar wave guide structures. The method includes forming channel-shaped structures in a planar substrate. The channel-shaped structures are introduced sequentially into the planar substrate by a stamping tool, the planar substrate and the stamping tool are moved relative to one another. The channel-shaped structures are then filled with a wave guide material.

According to the invention, it is provided that the channel-shaped structures are introduced sequentially into the substrate by the stamping tool, the substrate and the stamping tool are moved relative to one another. The fact that the substrate that is to be structured is stamped sequentially, i.e. in spatial succession, results in that it is possible to structure a surface of virtually any desired size. The method is also relatively easy to carry out, since all that is required for the structuring is a stamping tool with a surface that has been structured in accordance with the structures that are to be produced.

In a preferred configuration, the stamping tool used is a cylindrical tool with a structured surface, in particular a stamping roller that rolls over the substrate. In this case, the cylindrical tool has narrow encircling rings on its circumference, which produce the channel-shaped structures for the wave guides. The substrate is preferably pulled through between two oppositely rotating rollers, of which one is a stamping roller with a structured surface and the other is a mating roller or pressure-exerting roller (roll-to-roll method).

Alternatively, the stamping tool is a cutting comb with a structured edge that presses the desired channel-shaped structures into the substrate. The cutting comb is, for example, a doctor tool with a structured edge.

In a preferred configuration of the invention, the substrate is a polymer sheet into which the stamping tool presses the channel-shaped structures. The polymer sheet and/or the stamping tool are preferably heated during the stamping operation, in order to make it easier to stamp in the structures.

Alternatively, the substrate is formed of a pasty layer material that has been applied to a flat base and into which the stamping tool presses or cuts the channel-shaped structures. The layer material is initially cured after the channel-shaped structures have been introduced, and then a wave guide material is introduced into the cured structures. The latter preferably takes place by a treatment with a doctor tool. Finally, the wave guide channels are provided with a covering layer. When using a polymer sheet as the substrate, only one curing operation is provided, specifically after the wave guide material has been introduced into the structures which have been produced.

In a preferred refinement of the invention, the stamping tool is moved perpendicular to the direction of movement of the substrate, so that curved channel-shaped structures can be produced. This leads to a greater flexibility with regard to the path of the wave guides in the substrate. A transverse displacement, which is, for example, computer-controlled, of the stamping tool during the stamping operation enables different curved wave guide structures to be produced in a substrate using one stamping tool.

In a preferred refinement, at least two stamping tools are disposed behind one another, at least one of which is moved perpendicular to the direction of movement of the substrate, so that it is possible to produce channel-shaped structures which branch apart and/or merge.

The device according to the invention includes a stamping tool that sequentially introduces channel-shaped structures into the substrate, which is moved relative to the stamping tool. In the device it is on the one hand possible for the stamping tool to be moved with respect to a stationary substrate, while on the other hand it is also possible for the substrate to be moved with respect to a stationary stamping tool. Solutions which come somewhere in between are also possible, since all that is important is for the stamping tool and the substrate to be moved relative to one another. In the configuration, there is preferably a transport device for transporting the flat substrate and/or the stamping tool.

In addition, the device preferably has an application device for applying the wave guide material to the substrate, a doctor device for filling the channel-shaped structures with the wave guide material, a curing device for curing the wave guide material and means for applying a covering layer to the structures which have been filled with the wave guide material.

Other features which are considered as characteristic for the invention are set forth in the appended claims.

Although the invention is illustrated and described herein as embodied in a method and a device for producing large-area planar wave guide structures, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
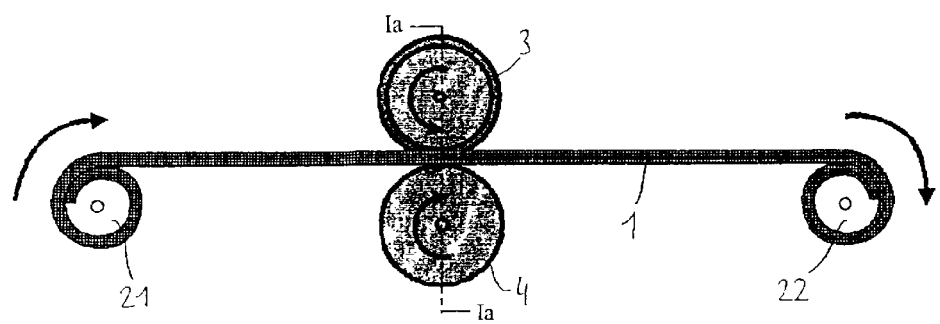
FIG. 1 is a diagrammatic, side-elevational view of a first embodiment of a device for producing large-area planar wave guide structures, in which a stamping roller is used as the stamping tool according to the invention.

Referring now to the figures of the drawing in detail and first, particularly, to FIG. 1 thereof, there is shown a device which is used to provide a polymer sheet 1 or a sheet which is formed of a similar material with channel-shaped structures.

Figure 1A:
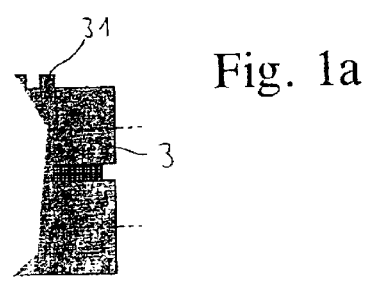
FIG. 1a is a partial, sectional view through the device illustrated in FIG. 1, taken along the line Ia—Ia.

The sheet 1 which is to be structured is wound from an unwinding reel 21 onto a winding-up reel 22 and is pulled through between a stamping roller 3 and a pressure-exerting roller 4 at a substantially constant speed. As shown in FIG. 1a, the stamping roller 3 has a multiplicity of narrow encircling rings 31, which are rectangular in cross section, on its cylindrical circumference. By contrast, a surface of the pressure-exerting roller 4 is smooth.

When the sheet 1 is pulled past the stamping roller 3 and the pressure-exerting roller 4 using the "roll-to-roll" method, the structures 31 applied to the surface of the stamping roller 3 stamp or press into the polymer sheet 1 and, in the process, produce grooves or channel-shaped structures 11. This is diagrammatically illustrated in FIG. 5.

Figure 5:
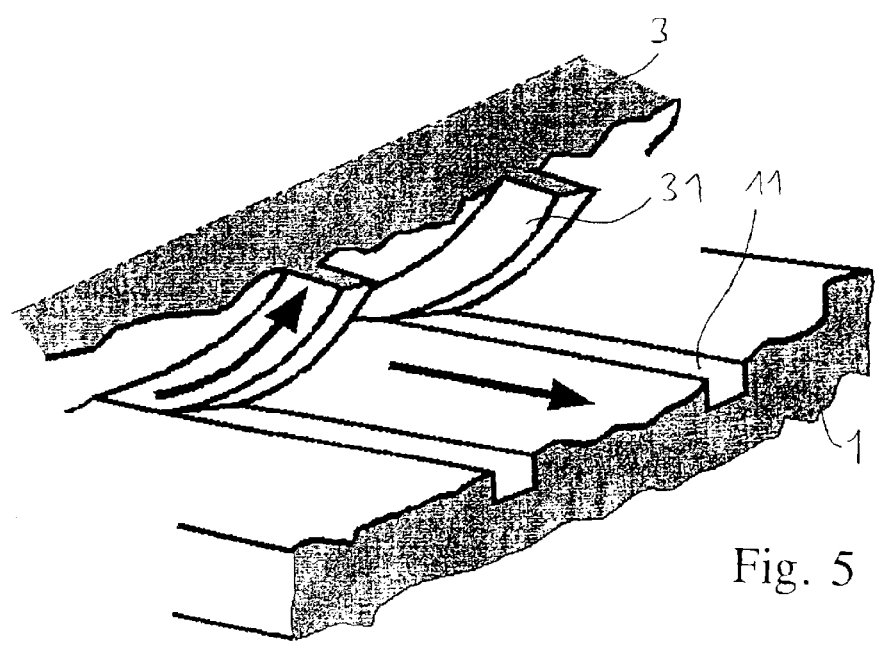
FIG. 5 is a perspective view of the stamping of a channel-shaped structure into a surface of a polymer sheet.

Naturally, the rings 31 on the circumference of the stamping roller 3 define a width, depth and shape of the structures 11 produced during the stamping operation. In this context, it should be noted that the notches 31 in FIG. 1a and FIG. 5 are only diagrammatically illustrated. The distances between the notches may also differ according to the required wave guide structures, and the notches 31 may also be of a different size and shape.

The stamping operation illustrated in FIG. 1 preferably takes place with the polymer sheet 1 and/or the rollers 3, 4 at an elevated temperature. This makes it easier to stamp the desired structures into the polymer sheet 1.

The size of the surface which is structured using the described method is limited only by a length of the rolled-up sheet 1 and a width of the stamping roller 3 and/or pressure-exerting roller 4. Therefore, surface areas of virtually any desired size can be provided with a desired structuring.

Precision guidance of the sheet 1 between the rolls 21, 22 ensures that the structures are introduced into the polymer sheet 1 with a high degree of accuracy.

After the sheet 1 has been structured, a wave guide core material is placed into the channel-shaped structures which have been produced, for example using a doctor tool. The wave guide structure formed is cured and is then closed off and sealed with respect to the environment by a flat covering layer. Corresponding further parts of the device are not specifically illustrated in FIG. 1, but are described below in connection with FIG. 4.

Figure 2:
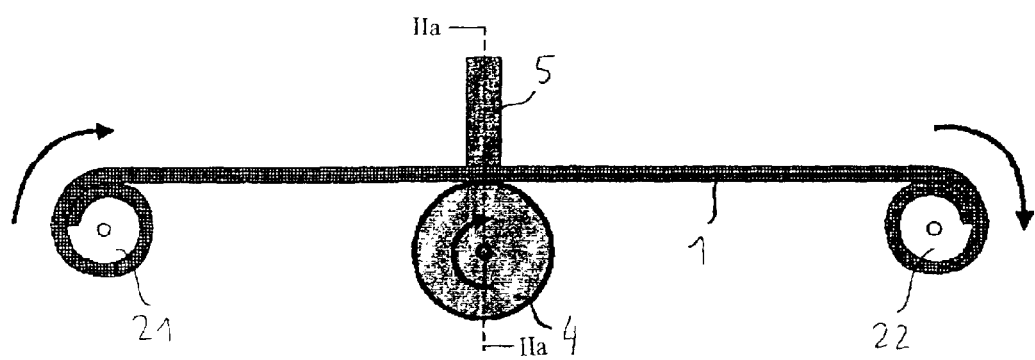
FIG. 2 is a side-elevational view of a second embodiment of the device according to the invention, in which a cutting comb is used as the stamping tool.
Figure 2A:
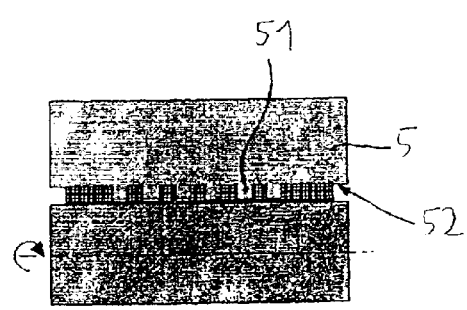
FIG. 2a is a sectional view through the device illustrated in FIG. 2, taken along the line IIa—IIa.

In FIGS. 2 and 2a, with fundamentally the same configuration as in FIG. 1, a cutting comb or doctor tool 5 with a structured edge 52 is used as the stamping tool instead of a stamping roll 3. Rectangular projections 51 which correspond to the wave guide structures to be formed are formed on the surface of the doctor edge 52 and, in the event of a movement of the sheet 1 relative to the doctor tool 5 and the pressure-exerting roller 4, the projections 51 stamp or press their shape into the sheet material 1. In this case, it is preferable for the projections 51 to be beveled on their side that faces the unwinding reel 21, so that the sheet 1 which arrives is stamped with a certain transition being provided.

In the exemplary embodiment shown in FIG. 2, the sheet is once again preferably heated, so that the structure that is to be formed can be stamped into the sheet 1 more successfully.

Figure 3:
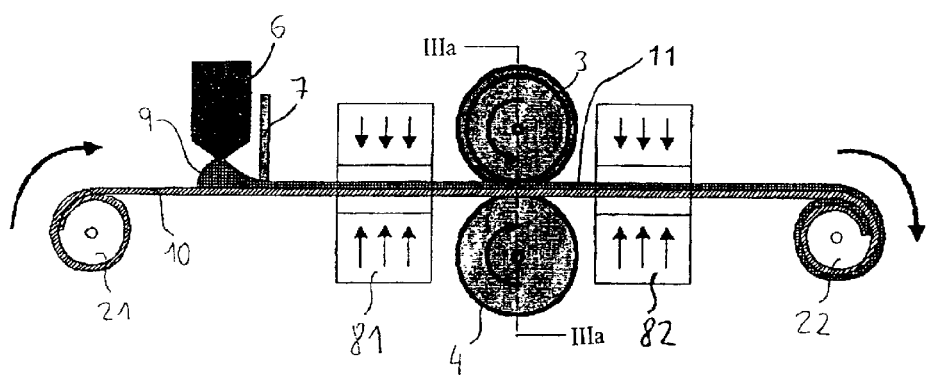
FIG. 3 is a side-elevational view of a third embodiment of the device according to the invention, in which the structuring takes place in a layer material that is to be applied.

In the exemplary embodiment shown in FIG. 3, a desired wave guide structure is not stamped into the sheet 1, but rather into a layer material 9 which is applied to a flat base substrate 10, for example likewise to a sheet. In this case, the base substrate 10, as in FIGS. 1 and 2, is transported from an unwinding reel 21 toward a winding-up reel 22. The layer material 9 can preferably flow slightly and is in the form of a paste, being applied to the base substrate 10 by a nozzle 6. Downstream of the nozzle 6 there is a doctor tool 7 or a stripper, a bottom stripping edge of which is disposed at a defined height above the base substrate 10. Therefore, after passing through the doctor tool 7, there are two layers of defined height one above the other, one layer being formed by the base substrate 10 and the other layer being formed by the applied layer material 9.

Figure 3A:
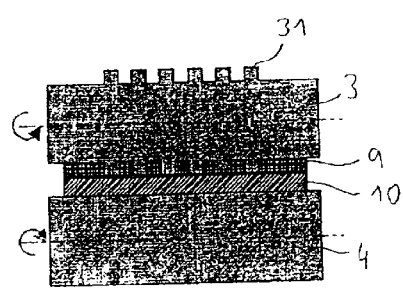
FIG. 3a is a sectional view through the device shown in FIG. 3, taken along the line IIIa—IIIa.

The layer material 9 is then cured in a furnace 81. It then passes through the stamping roller 3 and the pressure-exerting roller 4 which are configured in a corresponding way to the stamping roller 3 and the pressure-exerting roller 4 illustrated in FIG. 1. As shown in FIG. 3a, as the base substrate 10 and the layer material 9 are transported between the two rollers 3, 4, the surface contour of the stamping roller 3 is transferred onto or reproduced on the layer material 9.

After the desired channel-shaped structures 11 have been formed in the layer material 9, the layer material 9 passes through a further furnace 82 in order for the structure obtained to be cured.

It should be noted that in the exemplary embodiment illustrated in FIG. 3, the surface of the stamping roller 3 is formed of or is sealed with a material that does not adhere to the layer material 9.

Figure 4:
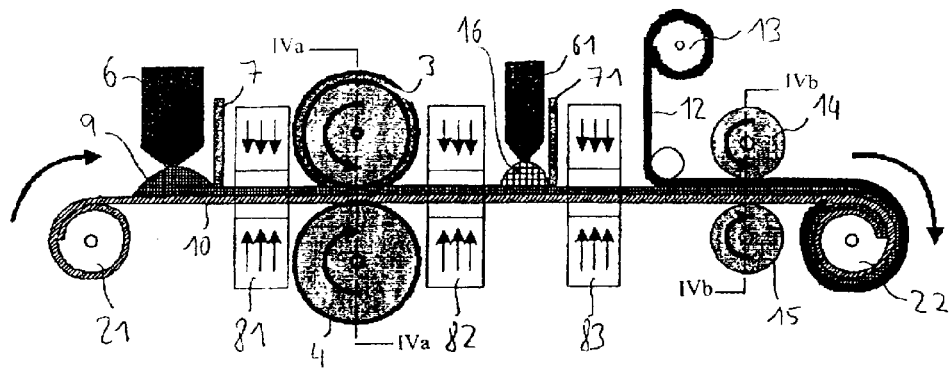
FIG. 4 is a side-elevational view of the embodiment illustrated in FIG. 3 with devices for applying wave guide material and a covering sheet.

FIG. 4 illustrates a device for producing wave guide structures on large-area substrates to which additional components have been added.

As in FIG. 3, the layer material 9 is applied to the base substrate 10 by the nozzle 6, then the layer material 9 is brought to a defined thickness or height by the doctor tool 7, is cured in the furnace 81, is then provided with a desired channel-shaped structures 11 by rollers 3, 4 and, after it has left the rollers 3, 4, is cured further in the further furnace 82.

The furnace 82 is adjoined by a further nozzle 61, by which a core material 16 for the wave guides that are to be formed is applied to the layer material 9. Immediately downstream of the nozzle 6 there is a further doctor tool 71. The doctor tool 71 is positioned in such a manner that it ends precisely at the surface of the layer material 9. This leads to the core material 16 for the wave guides which are to be formed being introduced only into the channel-shaped structures 11 which have been formed.

After the channel-shaped structures 11 have been filled with the core material 16 for forming the wave guides, the core material 16 is cured in a further furnace 83.

Finally, a covering layer in the form of a sheet 12 is laid on top of the layer material 9 and the channel-shaped structures 11 that are filled with the core material 16. For this purpose, a further unwinding reel 13 and two pressure-exerting rollers 14, 15 are provided. The finished structure is wound onto the winding-up reel 22. Other covering layers can also be applied instead of the sheet 12.

Figure 4A:
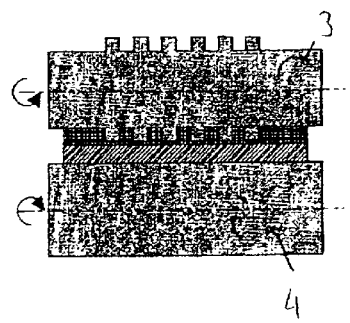
FIG. 4a is a sectional view through the device illustrated in FIG. 4, taken along the line IVa—IVa.
Figure 4B:
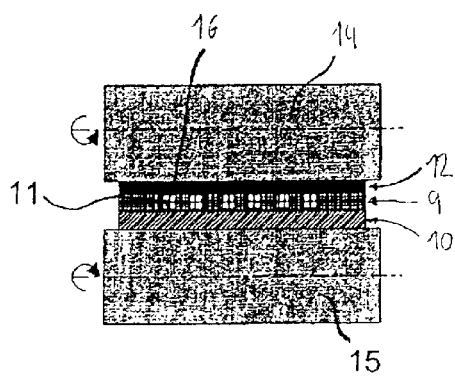
FIG. 4b is a sectional view through the device illustrated in FIG. 4, taken along the line IVb—IVb.

FIG. 4a corresponds to FIG. 3a. It can be seen from FIG. 4b that the core material 16 for the wave guides is formed only in the channel-shaped structures 11 or grooves of the layer material 9 and is covered by the covering layer 12.

Figure 6A:
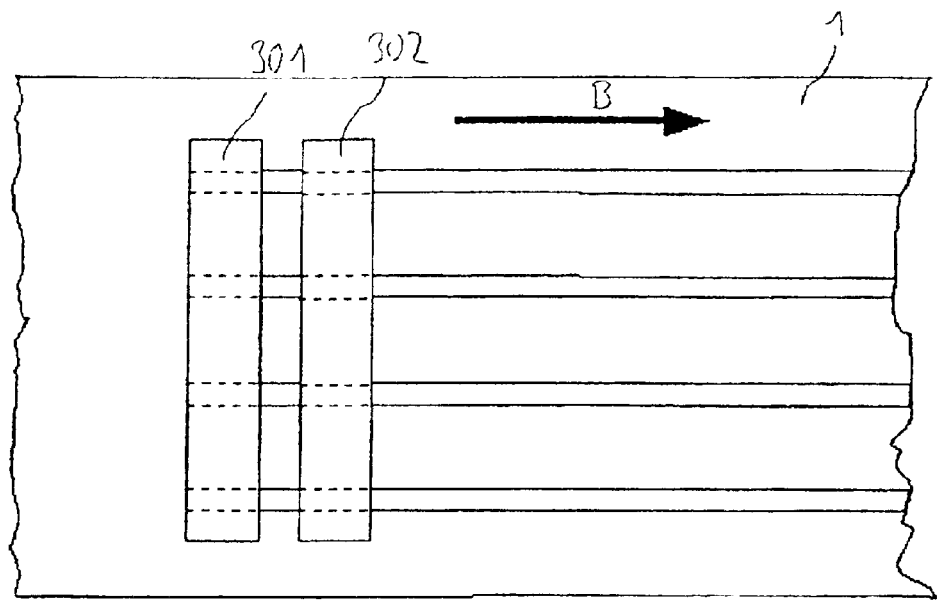
FIG. 6a is a plan view of the device according to the invention with two stamping tools disposed one behind the other.
Figure 6B:
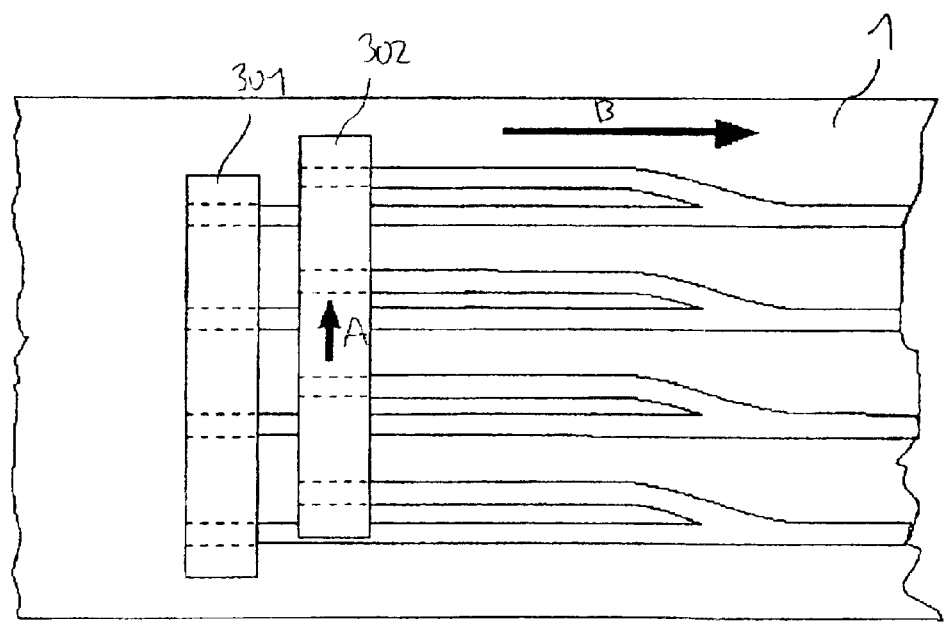
FIG. 6b is a plan view of the device illustrated in FIG. 6a, in which the two stamping tools can move relative to one another perpendicular to the direction of transport of the substrate which is to be structured.

FIG. 6a illustrates a device in which two stamping tools 301, 302 are provided one behind the other. The stamping tools 301, 302 are diagrammatically illustrated and may be configured in accordance with the stamping tools described above. As shown best in FIG. 6b, the stamping tool 302 can move in a direction A that runs perpendicular to a direction of movement B of the substrate 1 which is to be structured. Suitable relative movement of the stamping tool 302 with respect to the stamping tool 301 enables optical splitters or combiners to be produced during the structuring process, as indicated in FIG. 6b. This makes it possible, given suitable guidance of the stamping tools 301, 302 and of any further stamping tools, to produce even complicated wave-guide structures.

It should be noted that even when only one stamping tool is being used, the tool can preferably move perpendicular to the direction of movement of the material which is to be structured. In this way, it is possible to produce curved wave guide structures on the substrate.

The configuration of the invention is not restricted to the exemplary embodiments presented above. All that is essential to the invention is that channel-shaped structures be applied to a substrate sequentially by a stamping tool, with the substrate and stamping tool being moved relative to one another.

We claim:

1. A method for producing large-area planar wave guide structures, which comprises the steps of:

forming channel-shaped structures in a planar substrate, the channel-shaped structures being introduced sequentially into the planar substrate by a stamping tool, the planar substrate and the stamping tool being moved relative to one another, the channel-shaped structures continuously extending in the direction of the relative movement of the substrate to the stamping tool, the formed channel-shaped structures perpendicular to a rotating axis of the stamping tool; and filling the channel-shaped structures with a wave guide material.

2. The method according to claim 1, which comprises using a cylindrical tool with a structured surface as the stamping tool.

3. The method according to claim 2, which comprises providing the cylindrical tool with narrow encircling rings disposed on a circumference of the cylindrical tool.

4. The method according to claim 3, which comprises moving the planar substrate past two oppositely rotating rollers, of which one is the cylindrical tool with the narrow encircling rings and the other is a mating roller.

5. The method according to claim 1, which comprises using a cutting comb with a structured edge as the stamping tool, the structured edge pressing the channel-shaped structures into the planar substrate.

6. The method according to claim 1, which comprises using a polymer sheet as the planar substrate into which the stamping tool presses the channel-shaped structures.

7. The method according to claim 1, which comprises forming the planar substrate from a pasty layer material applied to a flat base and into which the stamping tool one of presses and cuts the channel-shaped structures.

8. The method according to claim 7, which comprises curing the pasty layer material after the channel-shaped structures have been introduced.

9. The method according to claim 1, which comprises heating at least one of the stamping tool and the planar substrate while the channel-shaped structures are being formed.

10. The method according to claim 1, wherein the channel-shaped structures are filled with a wave guide core material.

11. The method according to claim 10, which comprises providing a flat covering layer over the planar substrate with the channel-shaped structures filled with the wave guide core material.

12. The method according to claim 1, which comprises moving the stamping tool perpendicular to a direction of movement of the planar substrate, leading to a production of curved channel-shaped structures.

13. The method according to claim 1, which comprises using at least two stamping tools disposed behind one another, at least one of the two stamping tools is moved perpendicular to a direction of movement of the planar substrate for forming the channel-shaped structures with branches, the branches being at least one of merging branches and separating branches.

14. The method according to claim 1, which comprises using a stamping roller with a structured surface as the stamping tool that rolls over the planar substrate.

* * * * *

UNITED STATES PATENT AND TRADEMARK OFFICE
CERTIFICATE OF CORRECTION

PATENT NO. : 6,925,700 B2  Page 1 of 1
APPLICATION NO. : 10/012852
DATED : August 9, 2005
INVENTOR(S) : Jörg-Reinhardt Kropp et al.

It is certified that error appears in the above-identified patent and that said Letters Patent is hereby corrected as shown below:

On Title Page

Item [73] should read as follows:

Infineon Technologies AG, Munich (DE) and
Fraunhofer-Gesellschaft, Munich (DE).

Signed and Sealed this

Nineteenth Day of May, 2009

JOHN DOLL
*Acting Director of the United States Patent and Trademark Office*